Figure 11:
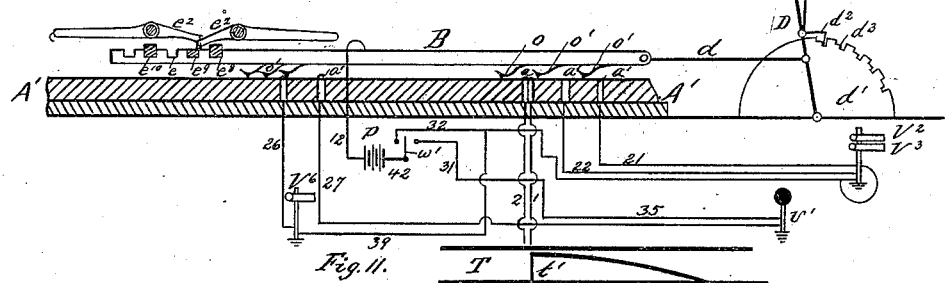

(No Model.) 8 Sheets—Sheet 1.
G. WESTINGHOUSE, Jr.
ELECTRO PNEUMATIC INTERLOCKING APPARATUS.
No. 358,519. Patented Mar. 1, 1887.
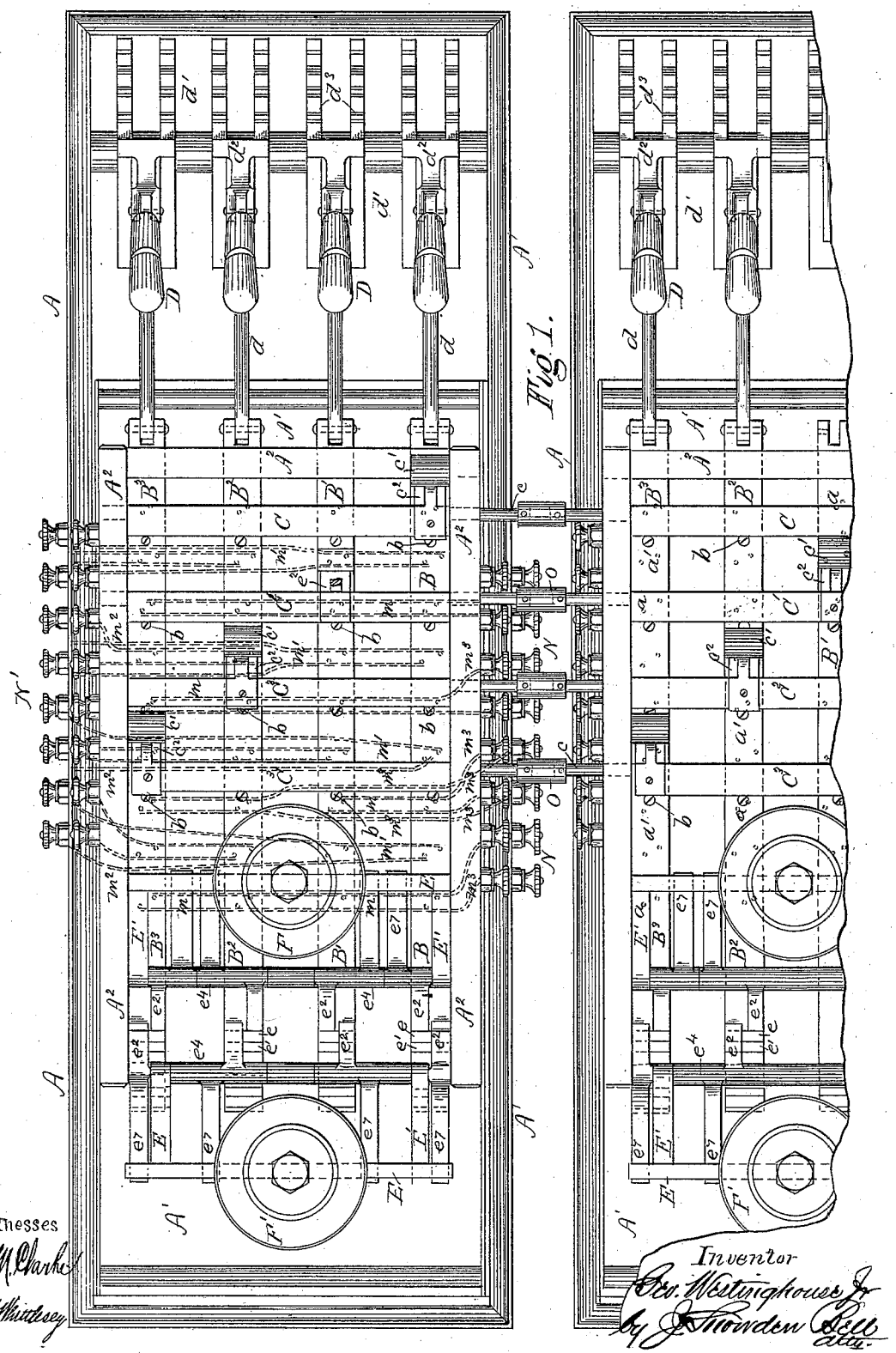

(No Model.)  8 Sheets—Sheet 2.
G. WESTINGHOUSE, Jr.
ELECTRO PNEUMATIC INTERLOCKING APPARATUS.
No. 358,519. Patented Mar. 1, 1887.
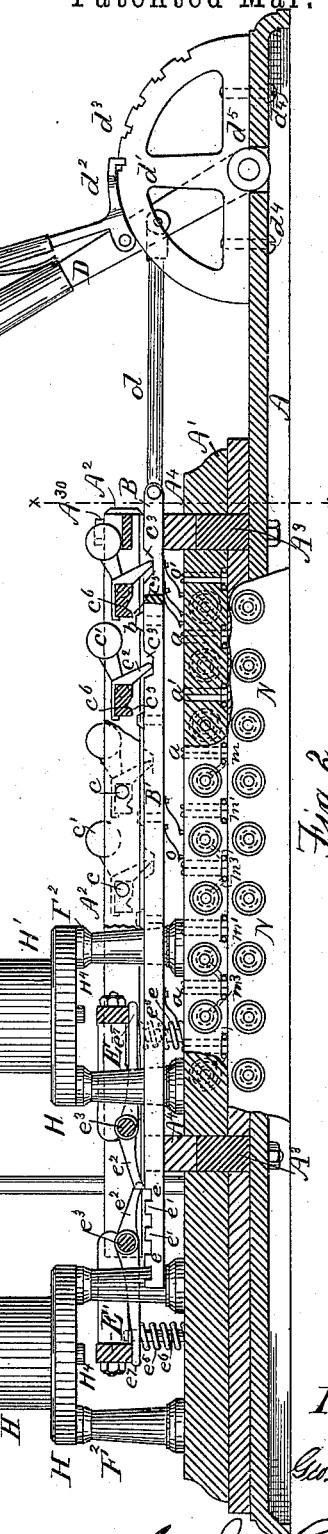

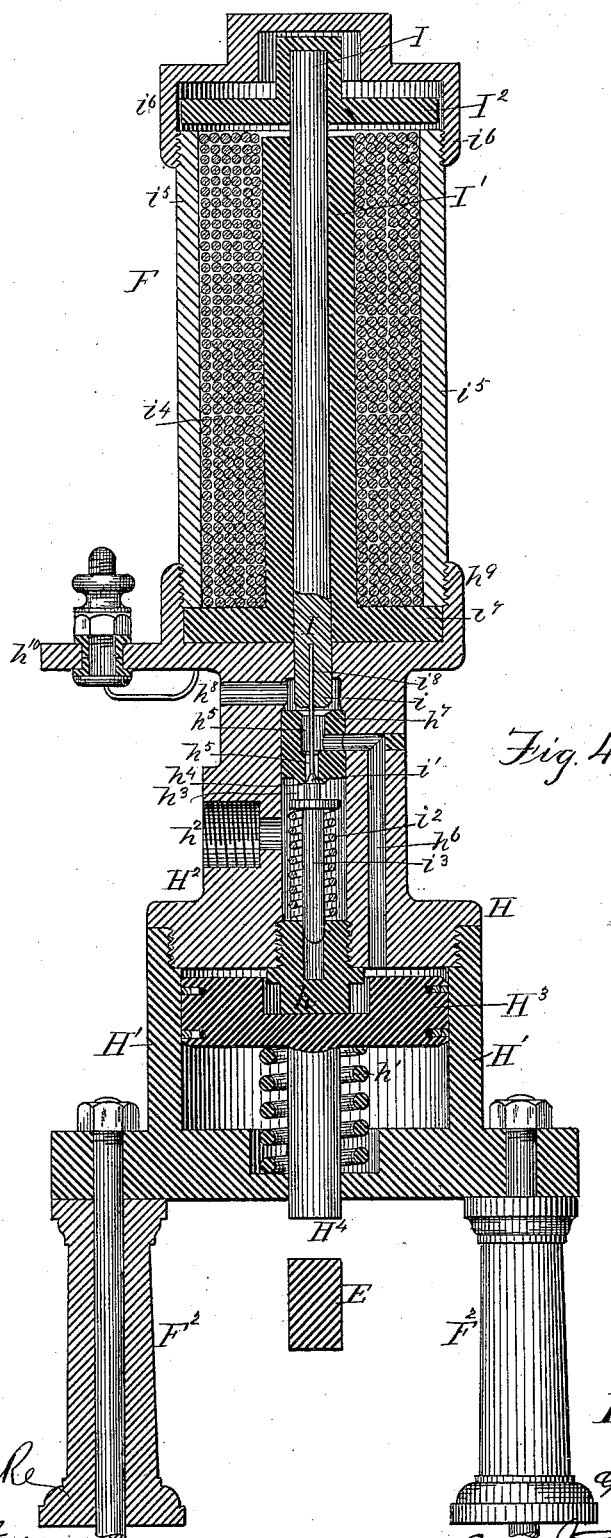

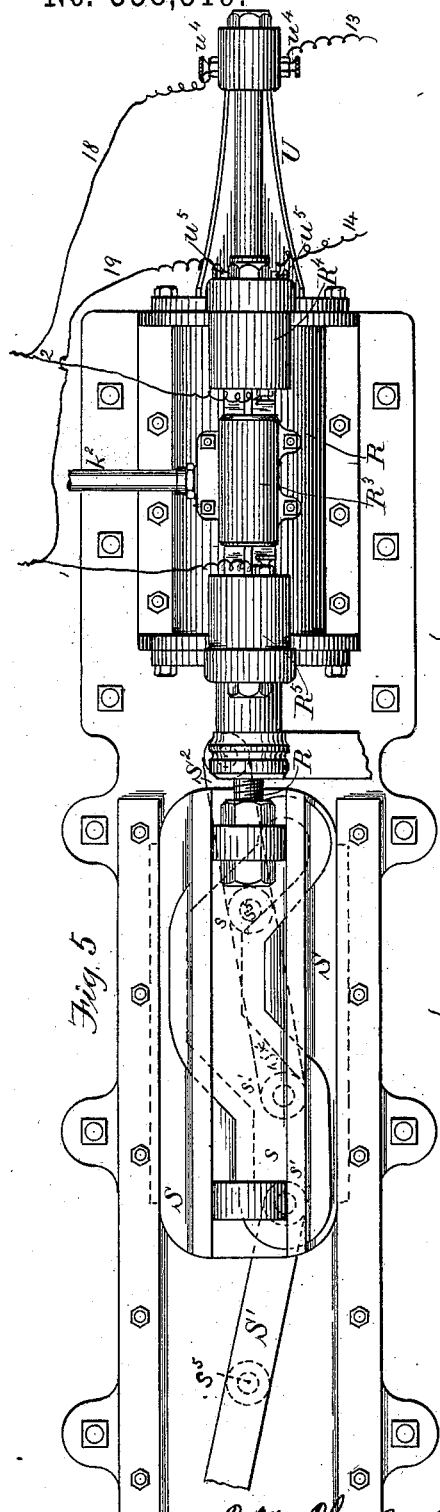

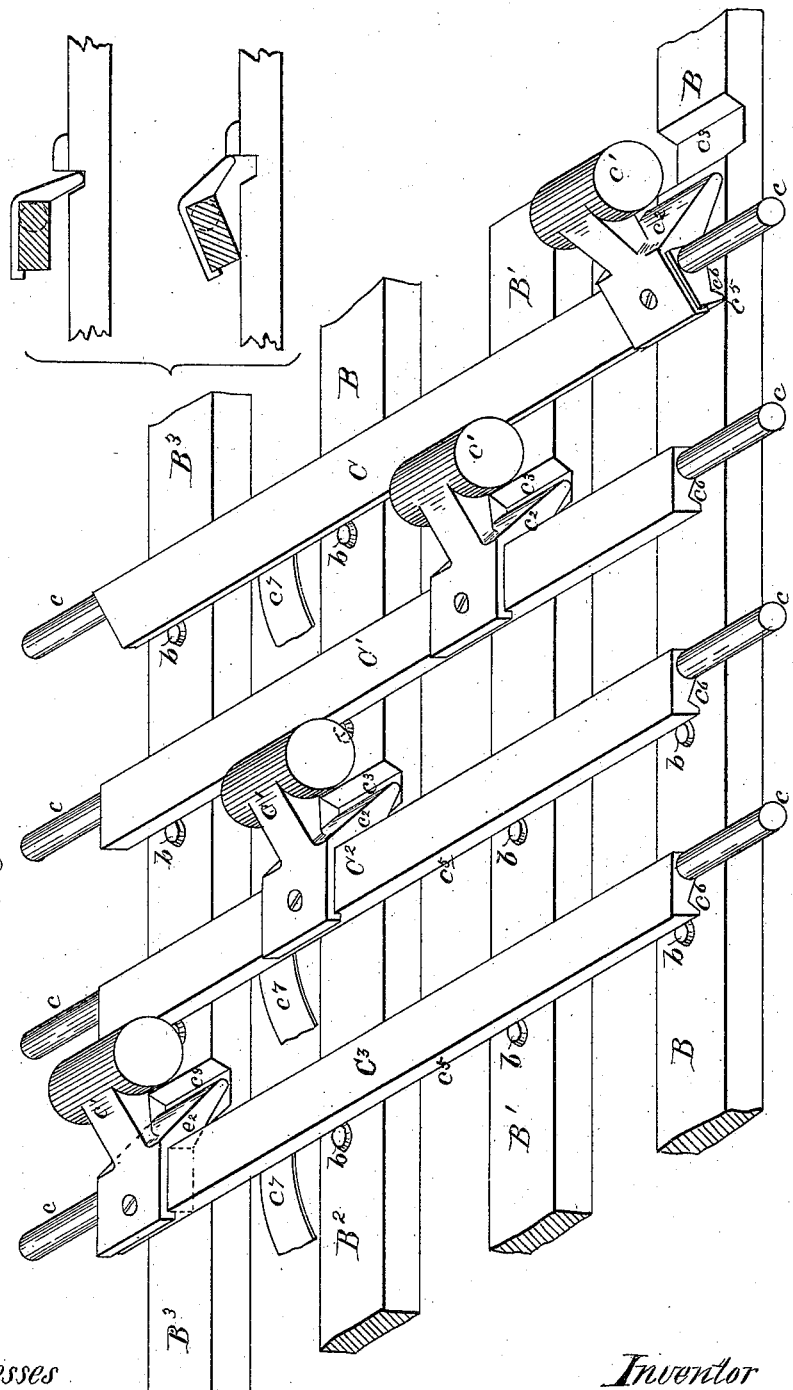

(No Model.) 8 Sheets—Sheet 6.
G. WESTINGHOUSE, Jr.
ELECTRO PNEUMATIC INTERLOCKING APPARATUS.
No. 358,519. Patented Mar. 1, 1887.
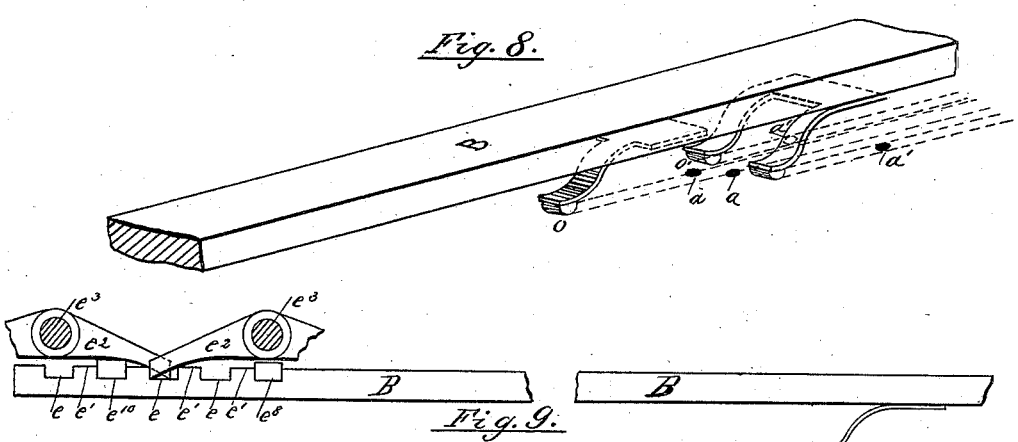
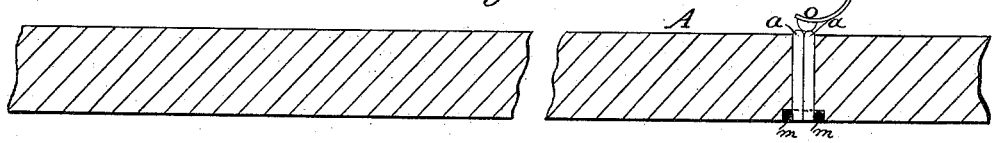
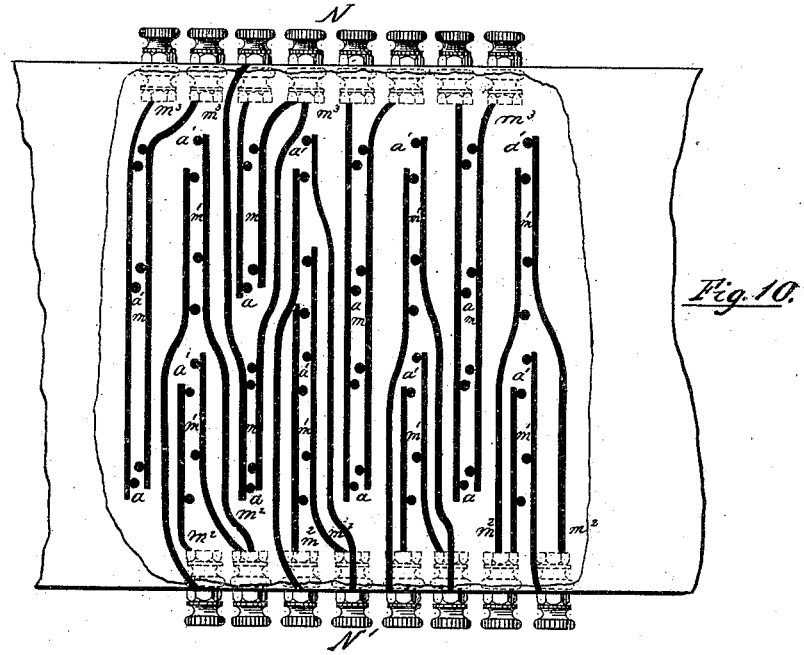

(No Model.) 8 Sheets—Sheet 7.

G. WESTINGHOUSE, Jr.
ELECTRO PNEUMATIC INTERLOCKING APPARATUS.

No. 358,519. Patented Mar. 1, 1887.

Witnesses:
C. M. Clarke
R. H. Whittlesey

Inventor.
Geo. Westinghouse Jr.
by J. Snowden Bell
atty.

N. PETERS, Photo-Lithographer, Washington, D. C.

(No Model.)　　　　　　　　　　　　　　　　　　　　8 Sheets—Sheet 8.
G. WESTINGHOUSE, Jr.
ELECTRO PNEUMATIC INTERLOCKING APPARATUS.
No. 358,519.　　　　　　　　　　　　　　　Patented Mar. 1, 1887.

Witnesses:　　　　　　　　　　　　　　　　　　Inventor.

UNITED STATES PATENT OFFICE.

GEORGE WESTINGHOUSE, JR., OF PITTSBURG, PENNSYLVANIA.

ELECTRO-PNEUMATIC INTERLOCKING APPARATUS.

SPECIFICATION forming part of Letters Patent No. 358,519, dated March 1, 1887.

Application filed August 25, 1886. Serial No. 211,819. (No model.)

*To all whom it may concern:*

Be it known that I, GEORGE WESTINGHOUSE, Jr., residing at Pittsburg, in the county of Allegheny and State of Pennsylvania, a citizen of the United States, have invented or discovered a certain new and useful Improvement in Electro-Pneumatic Interlocking Apparatus, of which improvement the following is a specification.

In the accompanying drawings, which make part of this specification, Figure 1, Sheet 1, is a plan view of one and a portion of another of my improved electro-pneumatic interlocking machines for operating railway switches and signals. Fig. 2, Sheet 2, is a view of the apparatus in side elevation, a part being in section or broken away at and near each end. Fig. 3 is a view in transverse sectional elevation taken in the plane of the lines $x$ $x$, Fig. 2. Fig. 4, Sheet 3, is a vertical sectional view of one of the electro-pneumatic devices employed in manipulating the locking-pawls, the scale of this figure being at or about full working size. Fig. 5, Sheet 4, is a top plan view of an electro-pneumatic engine employed for shifting switches and for making and breaking electric circuits through the interlocking mechanism. Fig. 6 shows a longitudinal vertical section of a portion of the switch-shifting engine, drawn to larger scale than Fig. 5. Fig. 7, Sheet 5, is a perspective view of the rocking bars and the longitudinally sliding bar, the ends of the latter being broken away, the same being illustrative of the mechanism for locking one or more of the sliding bars by movement of any one of them. Fig. 7$^a$ is a transverse section through one of the rocking bars and a view in elevation of one of the sliding bars, illustrating a modification in the means for returning the rocking bars to horizontal position. Fig. 8, Sheet 6, is a perspective view of a portion of one sliding bar, of the pawls interlocking therewith, and of the electric-circuit terminals with which the springs make contact by movement of the bar. Fig. 9 is a view in sectional elevation of the parts shown in Fig. 8, the same being illustrative of the relationship between the locking-pawls, their notches, and the electric-contact terminals, Figs. 7, 8, and 9 being approximately to the same scale and larger than Figs. 1 and 2. Fig. 10 is a bottom plan of a portion of the machine, Fig. 1, drawn to the same scale and illustrative of electric-circuit connections made in the bed. Figs. 11, 12, 13, 14, and 15, Sheet 7, are diagrammatic views, drawn to a reduced scale, illustrative of contacts and circuits made at successive steps in the operation of drawing or moving the sliding bars, also of the relationship of the same to the locking-pawls, the hand-levers, and lever-segments; and Fig. 16, Sheet 8, is a diagram illustrative of circuits and mechanism employed in my invention.

My invention relates to interlocking mechanism for controlling electrically the pneumatic or other pressure appliances for moving and setting switches and signals; and, in general terms, it consists of certain combinations of sliding bars operated by hand-levers, pivoted rocking bars operated by and interlocking with the sliding bars, pivoted pawls or dogs interlocking with the sliding bars and operated by spring and by electro-pneumatic pressure mechanism for operating switches and for controlling electric circuits through the unlocking mechanism, electrically-controlled mechanism for operating signals, make-and-break mechanism operated by movement of the sliding bars for making and breaking circuits to the switch mechanism, the interlocking mechanism and the signal mechanism, and means for making and breaking such circuits independent of the sliding bars, as hereinafter more fully described and claimed.

I have illustrated my invention in the form of a four-lever machine, adapted by its circuits and connections (see Fig. 16) to control the movement of four switch-points, $t'$ $t^2$ $t^3$ $t^4$, on the double track T T'; also, of signals V' V$^2$ V$^3$ V$^4$ V$^5$ V$^6$ for main line and signals $v'$ $v^2$ $v^3$ $v^4$ for switches. This form and application of the apparatus is selected because of its simplicity and freedom from complicated combinations involved where provision is made for numerous train movements. I do not wish, however, to limit the application of my invention to this or any particular combination of switches and signals for effecting particular train movements, as by simple increase in the number of the working parts and their connections, herein shown and described, it may by the exercise of the proper skill be adapted to any and all the various conditions and requirements of train movements on railways.

In the drawings I have illustrated my invention adapted for use in any one of three cases, namely: first, for small yards, in which, the track being cleared for some one train movement, no other movement can be effected until the one first set has been returned to normal position; second, where two or more switches with appropriate signals (together constituting a combination for some desired train movement) may be set either for the whole or a part of such combination, thereby providing for different train movements without a return to normal position between each movement, and, third, in the case of larger yards, in which two or more different movements may be carried on simultaneously without conflict.

I will first describe my invention as adapted to the case first stated, that being in some respects the simplest form of use.

The frame-work of the interlocking apparatus consists of a metallic base-plate, A, carrying a bed, A', of hard dry wood or other suitable electric insulating material, made, by preference, of two plates, and a metallic frame, $A^2$, of rectangular form, supported at a little distance above or free from the bed A' by posts $A^3$ and bars $A^4$, being bound thereto by bolts and nuts $A^{30}$. Longitudinally-sliding bars B B' $B^2$ $B^3$ (four in number in the present machine) are supported between the bed A' and frame $A^2$ by mortises or openings $a^4$, (see Fig. 3,) formed in the end cross-piece, $A^4$, or by other convenient and suitable bearings. Movement is giving to each of these sliding bars by the hand-levers D D, connected thereto by end pivoted rods $d$, the levers having pivot-fulcrums, as at $d^5$, between sector-plates $d'$, to which they may be locked by spring and lever actuated latch or catch $d^2$ and notches $d^3$, the sectors being secured rigidly to the base-plate by screws $d^4$. Four rocking bars, C C' $C^2$ $C^3$, (corresponding in number to the sliding bars,) are pivoted by end journals, $c$, in suitable holes or bearings in the side bars of frame $A^2$, thus crossing the frame above and at right angles to the sliding bars B B', &c. The pivot-bearings $c$ are by preference forward of the central line of their respective bars, and in order to overbalance the weight in rear of the pivot-line a weighted arm, $c'$, is extended forward from the front edge of each rocking-bar; or, as an equivalent of these weights, springs $c^7$ (see Fig. 7) may be secured to the under face of the rocking bar, which tend to tip the bars to horizontal or normal position by their pressure upon bed A'. The springs are shown broken off at their free ends; but the skilled mechanic will be able from this illustration and description to apply complete springs when desired. Backward rocking motion is given to these bars C C', &c., by an arm, $c^2$, extending forward and downward from each, the free end of which bears upon the upper face of its sliding bar below, each rocking bar having thus a bearing on its appropriate sliding bar—C on B, C' on B', $C^2$ on $B^2$, and $C^3$ on $B^3$.

In the upper face of each sliding bar is made a notch or recess, $c^3$, at such point in its length that when pushed back, as in Fig. 2, the arm $c^2$, bearing thereon, shall register with and drop into the notch, being moved by the weight $c'$ or spring $c^7$, thereby causing the rocking bars to assume a level or normal position, as illustrated in Figs. 2 and 7. On drawing out any one of the sliding bars the arm $c^2$ is lifted from its notch at the beginning of the sliding movement, thereby tipping its rocking bar C or C', &c., as the case may be, depressing its rear edge, by preference, to or nearly to the face of the bars. This movement of the rocking bar is employed to lock the remaining or unmoved sliding bars by engagement of the depressed edge $c^5$ of the bar so rocked with studs, lugs, or stops $b$, secured at intervals on the face of each sliding bar. In Fig. 1 the number of these stops on each bar is equal to the number of rocking bars, and their positions are immediately in rear of and in locking relation to the edges $c^5$ of the several rocking bars when the sliding bars are in normal position.

In the act of drawing any one of the sliding bars the stop immediately back of its rocking bar is moved in front of the locking-edge of such rocking bar, and at the same time and by the same movement the rocking bar is tipped into locking engagement with stops on each and all the other sliding bars, thereby preventing the drawing of any of them until the one first drawn has been returned, so as to restore its tipped rocking bar to horizontal or normal position. Consequently but one sliding bar can be drawn at a time, and all movements to be effected by it must be made and the bar returned to normal position before another can be operated.

In order to lock the sliding bars at intermediate points in their range of movement, notches $e$ $e$ are made in the upper face of the rear, corresponding in number (see Figs. 1 and 2) to the number of intermediate locks desired, such number corresponding, by preference, to the number of notches $d^3$ on the sectors $d'$. This last-named feature of relationship is not essential, however, in many instances in practical use, and therefore may not be observed unless desired.

Locking-pawls $e^2$ $e^2$—two for each sliding bar—are pivoted at or near their centers by rods $e^3$, secured on the side bars of frame $A^2$, the pivot-rods being at such distances apart that the adjacent ends of the locking-pawls may enter the notches from opposite directions, and, bearing upon the opposite sides of the notches, will prevent movement of the sliding bars in either direction, except such play or freedom of movement as may be provided by the width of the notches. In practice both the notches $e$ and shoulders $e'$ are made of sufficient width to permit of a short range of such play or movement of the bars both when the locking-pawls are in the notches and also when their points rest on the shoulders or full faces $e'$ between the notches. This feature of construction is best illustrated in Fig. 9. Its purpose will more fully appear in connection with features of construction for making and breaking electric circuits, hereinafter described.

The pivot-bearings $e^4$ of the locking-pawls are extended on the rods $e^3$, (see Fig. 1,) so as to prevent sidewise displacement and secure firm support. Under the tail-pieces $e^7$ of the pawls are seated springs $e^5$, guided by pins $e^6$. These springs, lifting upon the pawls, insure the prompt entry of their inner ends into the notches $e$. This result may be secured, if desired, by providing a preponderance of weight on the inner side of the pawls. I prefer to employ the springs, however, because they impart greater certainty and promptness of action to the pawl movements. Bars E E are pivoted by arms E' to rods $e^3$, their position being across and upon the outer ends of the tail-pieces $e^7$. These bars are employed to depress the outer ends of all the pawls of each set simultaneously, thereby lifting the inner ends from the notches and unlocking the sliding bars for movement, the direction of movement depending upon which set of pawls is lifted, as the case may require.

Downward movement is given to either one of the bars E, as required by conditions of use, hereinafter explained, by two fluid-pressure (by preference air-pressure) mechanisms, F F', supported in any suitable manner, as by posts $F^2$, above the bars E. These mechanisms are somewhat similar in construction and operation to the signal-operating mechanism described and claimed in a separate application filed by me August 30, 1886, Serial No. 212,179, and therefore I make no claim to them herein, individually considered. Both of these pressure devices F and F' are constructed and operated in similar manner, and hence corresponding parts are designated by the same letters of reference. Upon the base H, Fig. 4, is formed or secured the shell of a fluid (air) pressure cylinder, H'. The upper end of this cylinder is closed by head $H^2$ and screw-plug $h$. A packed piston, $H^3$, receives air-pressure above, thus depressing the stem $H^4$, and by it the bar E. Upward or reverse motion is given to the piston and stem by spring $h'$. Air or other desired fluid, under pressure, is supplied by pipes $k$ $k'$ (see Fig. 2) from any suitable compressing apparatus and reservoir, K, (see Fig. 16,) through port $h^2$, Fig. 4, valve-chamber $h^3$, port $h^4$, chambered bushing $h^5$, and passage $h^6$. Fluid exhaust is through passage $h^6$, chamber $h^5$, port $h^7$, and passage $h^8$ to the external air.

The escape-port $h^7$ is opened and closed by a valve, $i$, formed on the lower end of vertically-movable rod I. The lower port is governed by a puppet-valve, $i'$, a small stem, $i^8$, of which extends loosely upward into a core-recess in rod I, whereby downward movement of the rod closes port $h^7$ and opens port $h^4$. Valve $i'$ is seated and valve $i$ is opened by action of a spring, $i^2$, surrounding the lower stem, $i^3$.

Downward movement of rod I is imparted by means of an electrical helix, $i^4$, surrounded by a soft-iron magnet, $i^5$, which latter is screwed to brass base $h^9$ below and brass cap $i^6$ above. A tubular soft-iron core, I', having lower head-flange, $i^7$, affords an interior magnet. Above the helix and within the cap $i^6$ is an annular or disk-like armature, $I^2$, the stem I being of brass. The movements of the armature within the cap are limited downward by valve $i$ and seat $h^7$, thereby preventing contact between the armature and magnet. Upward movement is limited by the valve $i'$ and seat $h^4$. The usual binding-posts for circuit-connection through the helix may be secured to but electrically insulated from the extended base $h^{10}$.

Upon making circuit through the helix the armature $I^2$ will be attracted powerfully by two magnets, I' and $i^5$, thereby opening air-supply valve $i'$, closing the escape-valve $i$, and holding it closed against air-pressure below until the circuit is broken. One purpose of making the port $h^7$ and valve $i$ of comparatively large area is to counteract by air-pressure thereon any residual magnetism that may tend to hold the valve closed after breaking circuit, thereby providing for quick withdrawal of the plungers $H^3$ and prompt locking of the sliding bar by the pawls $e^2$.

In the mechanism thus far described it will be observed that by drawing one of the sliding bars all others will be locked, and that this is effected by mechanical appliances operated through the hand-levers; also, that the bar drawn is locked automatically by the pawls $e^2$ any desired number of times, depending upon the number of notches $e$ within its throw or range of motion. This range or extent of longitudinal movement is limited, as may be required by conditions of use, hereinafter illustrated, Fig. 9 and Figs. 11 to 15, by raised shoulder-stops $e^8$ $e^{10}$, secured by screws, or otherwise secured, either on the face of the bar or in some one or more of the notches $e$, as shown, in proper position to abut against the pawls and thereby arrest further movement; also, the number of locks to be effected may be regulated by filling some one or more of the notches $e$ with removable blocks $e^9$, secured like the stops $e^8$ $e^{10}$, which blocks practically bridge the notch and prevent the pawls from dropping therein. Any suitable form of bridge or other device may be employed for this purpose as an equivalent of the blocks, though I prefer the latter on account of simplicity and ease of application.

The movements of the sliding bars thus provided are employed in making and breaking electric circuits which control the action of the switch-shifting mechanism, the mechanism for unlocking the pawls, and the signal-actuating mechanism. To this end springs $o\ o'$, (see Figs. 2, 8, and 9,) in suitable number, as presently described, are secured to the under face of the sliding bars, the springs $o'$ being set on either side of the line of springs $o$. These springs, bending downward, press their free ends upon the upper face of bed-plate $A'$, and as the sliding bars are drawn they ride on the bed, the lines of bearing being indicated by the dotted lines, Fig. 8. In these lines of bearing they make contact each with its appropriate row or rows of pins or terminals $a\ a, a'\ a'$, &c., which extend upward through the upper plate of bed $A'$ from cross wires or strips $m\ m'$, set in suitable grooves in the under face of such plate. For economy of space and convenience in construction these cross-wires $m\ m'$ are grouped in pairs, the individuals of each pair being insulated electrically from others, and alternate pairs—say wires $m$—are connected by wires $m^3$ with binding-post $N$ on one side of the bed, and are assigned to switch-circuits, the remaining or intermediate pairs, $m'$, being connected by wires $m^2$ to posts $N'$ on the other side of the bed and assigned to signal-circuits. This feature of construction and arrangement of pairs and connections of alternate pairs is designed principally to facilitate compact and orderly arrangement of circuits. It is not an essential feature of construction, and may be varied without departing from my invention; also, some of the cross wires or strips $m$ are shown extending across the bed, (see Fig. 10,) with terminals $a\ a$ extending upward therefrom under all the sliding bars, while other wires $m$, toward the left, Figs. 1 and 10, and all the wires $m'$ extend part way across the bed, the separate parts being connected to different binding-posts by the wires $m^2$ or $m^3$. This feature of dividing the cross-wires $m\ m'$ is designed to increase the capacity of a machine of given number of sliding bars, since it frequently happens that many circuits are employed in but few combinations of switch and signals movements—such, for example, as are controlled by one or two sliding bars alone. By dividing the cross-wires into parts, each part having its terminal projections $a$ or $a'$ beneath some one or more of the sliding bars, and also having suitable connection with binding-posts $N$ or $N'$ for circuit-connection, provision is made for passing circuits under such of the sliding bars only as it may be desired to employ, while other circuits may be passed over other parts of the cross-wires to other sliding bars.

If for any cause it is desired to pass a circuit through terminals under all the sliding bars, continuous cross-wires, like the sets $m$, toward the right, Fig. 10, may be employed; or, if the cross-wires are divided, the desired result may be secured by making electrical connection between two or more binding-posts, which are connected to suitable parts of cross-wires $m$ or $m'$ to give terminals where desired.

I have also, for simplicity and convenience in construction, shown the terminals $a$ and $a'$ arranged in pairs, the terminals $a\ a$ from the switch-wires $m$ being separated transversely sufficiently to afford electrical insulation, but within the breadth of spring $o$, and also in such close proximity in longitudinal direction (see Fig. 9) as to permit contact of spring $o$ with either terminal of the pair by movement of the sliding bar within the range provided for it when the pawls $e^2$ are in the notches $e$. The purpose of this feature of construction will be understood more readily after description of the circuits and mechanism employed for operating switches, and it will be referred to again in such connection. Instead, however, of wide springs $o$, narrow or branching springs may be employed, one spring or branch for each terminal of a pair, $a\ a$; also, instead of arrangement of terminals in close pairs, they may, if desired, be set at any desired intervals in the path of the springs $o$, the springs being so set on the sliding bar as to make contact with two separate terminals $a$ in close succession or within the range of motion provided for the bar when locked at $e$, as above described. These and similar modifications in relative arrangement of springs and terminals, by which contacts may be secured in such immediate succession, are expressly included within my invention and within the meaning of the term "pairs" as employed herein to express such relationship and succession.

The signal-terminals $a'\ a'$ from cross-wires $m'$ may be arranged either in pairs, as shown, or at any desired intervals in the path of the springs $o'\ o'$, being separated transversely more than the terminals $a\ a$, so that the springs $o'$ for these signal-terminals may pass the switch-terminals $a\ a$ on either side without making contact therewith.

In practice the springs and terminals are set or arranged for each sliding bar in such order or relation that contact shall be made with different terminals in some orderly or predetermined succession, depending upon the train movements to be effected by each—that is, the movement of bar B makes contact through its springs with certain terminals in proper succession with reference to operating certain predetermined switches and signals in given order. The bar B' by its movement makes contact with the terminals beneath it in proper succession to operate the same or other switches and signals in different order from B, and so on through the entire machine. Before describing the switch and signal circuits which are made and broken by movement of these sliding bars, I will describe the power apparatus which I employ for shifting the switches and signals.

Signals may be operated by weight or spring actuated mechanism, an electric circuit being employed to control the movements of the signal mechanism, as ordinarily practiced in the art; or an electro-pneumatic apparatus may be used similar to that described in the application, Serial No. 212,179, above referred to.

For effecting switch-movements I prefer to employ an electro-pneumatic apparatus shown in plan and in sectional elevation in Sheet 4. No claim is made, however, to this switch-shifting apparatus alone considered, the same being included in the subject-matter of separate applications for patents, one having been filed by me August 30, 1886, Serial No. 212,180, with others to be filed hereafter. In this apparatus an air-pressure cylinder, R, is employed with piston R' and stem $R^2$, extending through one end of the cylinder, to which is attached a cam-plate, S, having a cam-groove, $s$, as indicated by dotted lines in its under face. Two levers, S' $S^2$, are pivoted on either side of the cam-plate in its line of motion, as at $s^5$ $s^5$. The inner or adjacent ends of these levers carry wrists $s'$, which play in the grooves $s$, and by movement of the cam-plate vibrate the levers in succession, first one and then the other. These movements are employed to unlock the switch through rod $s^2$, Fig. 16, and bell-crank lever $s^3$, and also to throw the switch through bridle or rod connection $s^4$. Air under pressure is supplied from main reservoir K, (see Fig. 16,) by pipe $k$ and branches $k^2$, Fig. 5, which branches enter the valve-chamber $R^3$. The slide-valve $r$, for distributing supply and exhaust to and from the cylinder, is actuated by two pistons, $r'$, connected thereto by a common tubular stem, $r^2$, and recessed rider $r^3$. The pistons $r'$ fit the chamber loosely, so as to permit of a retarded passage of air past them, or equivalent vents or small passages may be provided, leading from one side to the other. If air is permitted to escape from either end of chamber R, outside of the pistons $r'$, the pistons and valve will be moved toward the escape by excess of air-pressure on the inner face of such piston. If the escape is closed, leakage or passage past the pistons will in a short time establish equilibrium of pressure. Such air-escape is provided by small ports $r^5$, controlled by valves $r^4$, which are seated by springs $r^6$, aided by air-pressure within the stem $r^2$, admitted through port $r^7$. In order to unseat or open the valves, stems $r^8$ pass through tubular bushings $r^9$ and abut against or connect with push-rods $r^{10}$, which latter pass through the tubular core of helices $R^4$ $R^5$, and make screw-connection or other suitable attachment with disk-shaped armatures $r^{11}$, which are powerfully attracted on completion of electrical circuit through the helices by the inner and outer magnets, $r^{12}$ $r^{13}$.

If electrical circuit be completed, say, through the left-hand helix $R^5$, the left-hand valve $r^4$ will be opened, air will escape therefrom, the piston-rod $r'$ and valve $r$ will be carried to the left, as in Fig. 6, and air be admitted back of main piston R' to shift it to the left, with attendant movement of cam-plate S and throw of switch. On completion of circuit through right-hand helix $R^4$, these several movements will be reversed.

In order to make provision for forming new circuits upon completion of a switch movement, a stem, $u$, is attached to piston R' opposite and in line with stem $R^2$. This stem $u$ passes through the cylinder-head and moves longitudinally within a hollow shell, U, secured to the cylinder. An insulated metallic ring or button, $u'$, on the end of stem $u$, makes contact with springs $u^2$ $u^3$, secured to shell U at the two limits of stem-movement. Binding-posts $u^4$ $u^5$, having electrical connection with springs $u^2$ $u^3$, (the posts and springs being electrically insulated from the shell,) afford convenient means of making circuit-connections through these contacts. In connecting these switch-shifting engines with the posts N of the interlocking apparatus, two separate lines are used. For example, lines 1 and 2 connect two posts, N, with the helices $R^4$ $R^5$ of the shifter for switch $t'$; lines 3 and 4 with the helices of shifter for switch $t^3$; lines 5 and 6 with the shifter of switch $t^2$, and lines 7 and 8 with shifter for switch $t^4$. In the present instance lines 5 and 6 branch from or are practically continuations of lines 3 and 4, the switch-points $t^2$ $t^3$ being for cross-over, and therefore may be moved simultaneously by a divided current of sufficient strength. Each of these lines is connected to one terminal of its helix $R^4$ $R^5$, the other terminal being connected with the metal case R, from which ground or return circuit is made by air-pipes $k k$ and reservoir K, which latter is also connected by wire 10, key $w$, and wire 11 with one pole of battery P. The other pole of this battery is connected by wire 12 with the metallic frame of the interlocking apparatus, and through the frame and the sliding bars with the contact-springs $o$ $o'$, which, by movement of the sliding bars, are put in contact with the proper terminals, $a$ or $a'$, for making circuit over the desired line 1, 2, or 3, &c., as the case may require. In order to obtain a new circuit or an additional return for these circuits upon completion of the switch movement, branch lines 18 19 are carried from the lines leading to the helices of the switch-shifting engine to posts $u^4$ $u^5$. From thence wires 13 and 14 pass to and connect with common return-wires 15 16, which latter connect with the helices $i^4$ of the unlocking devices F F'—say wire 15 with F', and wire 16 with F. From both helices $i^4$ a common wire, 17, leads to key $w$, and thence when the key is closed to battery P. It will be observed that of these return-circuits one only is completed for a given position of the engine—say that through branch 18 and posts $u^4$ for the normal position shown in Figs. 5 and 6; also, that circuit on the line from which this branch 18 leads is for this position of the piston inoperative for actuating the engine, the piston being already in the position which it takes in response to action through helix $R^4$. The circuit through branch 19 around helix $R^5$, which latter alone is effective in moving the engine from normal position, is opened through post $u^5$, and is not completed therethrough until piston R' has completed its movement to the left. This return, as above described, is passed through F, and is employed to unlock the sliding bar for further movement outward. In returning the engine and switch to normal position this order of circuits is reversed—that is, the circuit around helix $R^5$ through line 19 is closed, while the circuit around helix $R^4$ through wire 18 and $F'$ is not completed until normal position of the engine and switch is restored, and this circuit, when made, is employed to unlock the sliding bars for further backward movement.

Referring again in this connection to the relative arrangement of terminals $a\ a$ and spring $o$, it has been stated that these terminals are grouped in pairs, (see Fig. 1,) or that the springs are arranged to make contact with them in close succession. In connecting up the switch-circuit lines 1 2 3, &c., the two lines of a switch-engine are connected through post N and wires $m$ to the terminals $a\ a$, constituting a pair with either of which contact may be made by springs $o$, while the locking-pawls $e^2$ rest in some one of the notches $e$. The lines for all the switch-engines are connected in similar manner each with its appropriate post N, giving circuit through the desired terminal in such manner that either circuit for each switch-engine may be made or broken by moving the sliding bar without lifting the corresponding locking-pawl $e^2$ from its notch. In these pairs of switch-connections the line 2 for helix $R^4$ makes connection with that terminal $a$ of its pair first in contact with the spring $o$ in drawing out the sliding bar, and the line for helix $R^5$—say line 1—makes connection with the terminal of such pair second in contact with the same or another like spring. These features of construction are designed to secure the proper succession of switch movements and unlocking movements in both forward and backward movement of the sliding bars.

It will be observed that the springs $o$ make contact with the switch-terminals $a$ when the hand-lever catch $d^2$ is about midway between sector-notches $d^3$, and the pawls $e^3$ are resting in some one of the notches $e$. In this position the sliding bars are locked by the pawls, as above described. On the other hand, the springs $o'$ are so set on the sliding bars that they make contact with signal-terminals $a'$ only when the hand-lever catches $d^2$ are in position to drop into the sector-notches $d^3$, and the pawls $e^2$ are resting on the shoulders $e'$. In this position the sliding bars are unlocked and are free to be moved in either direction to break the signal-circuit at $a'$. The sector-notches $d^3$, as shown, Fig. 2, are made double or with half and deep seats, the distance between such seats corresponding to the extent of motion provided for the sliding bars when the pawls $e^2$ rest on shoulders $e'$, as before described. This provision in construction may be used for different purposes. I prefer to employ it to enable the operator, after setting the switches for a train movement, to display "safety" or "danger" signals, as circumstances may require—for example, in case it may be desired to hold a train for a time. In this case the springs $o'$ are arranged to make contact with the terminals $a'$ when the catches $d^2$ are in position to drop into the deep seats of notches $d^3$, and to break such contact when the catches are in the half-seats of the notches. If, then, after setting a switch for train movement, it is desired to clear the signal, the catch $d^2$ is moved into the deep seat of the notch, thereby making signal-circuit and moving the signal to "safety." If, on the other hand, it is desired to give "danger" signal without affecting the previously-set switch, the lever D is moved back a little, bringing the catch $d^2$ into the half-seat of the notch, thereby breaking the signal-circuit and permitting the signals, one or more of them, to go to "danger," their normal position. The principal purpose in this connection of the notches $d^3$, and also of the half and deep seats therein, is to guide the operator in making and breaking the signal-circuits. By skillful manipulation the desired result might be secured without such guide; but, owing to the limited movement provided for making and breaking circuits, these equivalent guides in setting the bars will be useful and advantageous.

In connecting up circuits for signals a separate wire connects each signal with an appropriate binding-post, $N'$—for example, (see diagram, Fig. 16,) line 20 for signal $V'$, line 21 for $V^2$, line 22 for $V^3$, line 23 for $V^4$, line 24 for $V^5$, line 26 for $V^6$, line 27 for signal $v'$, line 28 for $v^2$, line 29 for $v^3$, and line 30 for $v^4$. These several lines lead from their respective posts $N'$ by wires $m^2$ and $m'$ in the bed $A'$, terminals $a'$, springs $o'$, sliding bars, and frame and wire 12 to one pole of battery P. In connecting the signals with the other pole of battery two separate return-wires, 31 and 32, are used, the signals $V'$, $V^5$, $V^4$, $v'$, and $v^2$ being connected by wires 32, 33, 34, 35, and 36, respectively, with wire 31, and the signals $V^2$, $V^3$, $V^6$, $v^3$, and $v^4$ being connected by wires 37, 38, 39, 40, and 41 with the wire 32. These return-wires 31 and 32, instead of making immediate connection with battery, are connected to the buttons of an ordinary electric switch, $w'$, from the lever of which a wire, 42, leads to battery P. This provision is made with reference to displaying at the pleasure of the operator one set of signals for movement in one direction—say any one or more of the signals connected with line 31—or a set for movement in the opposite direction—say any one or more of the signals connected with line 32. In order to do this without necessary movement of the sliding bars, all the signals pertaining to train movements in either direction over a given condition of track are connected either to one post N, or, if to different posts, which is the construction shown and preferred, then these different posts may be connected together electrically; or springs $o'$ and terminals $a'$ for these posts and signals may be arranged to make contact in unison, whereby one setting of a sliding bar for signals will complete circuit through the sliding bars and terminals $a'$ for all such signals. For example, assuming that signals $V^6$ $V^2$ are used in passing from main track T to siding $T^2$, and signal $v$ in passing back from siding $T^2$ to main track T, then the lines 26, 21, and 27 will be connected to posts $N'$, so that circuits may be made over the three in unison by contact of springs $o$ with terminals $a'$ in one position of the sliding bar.

Figure 16:
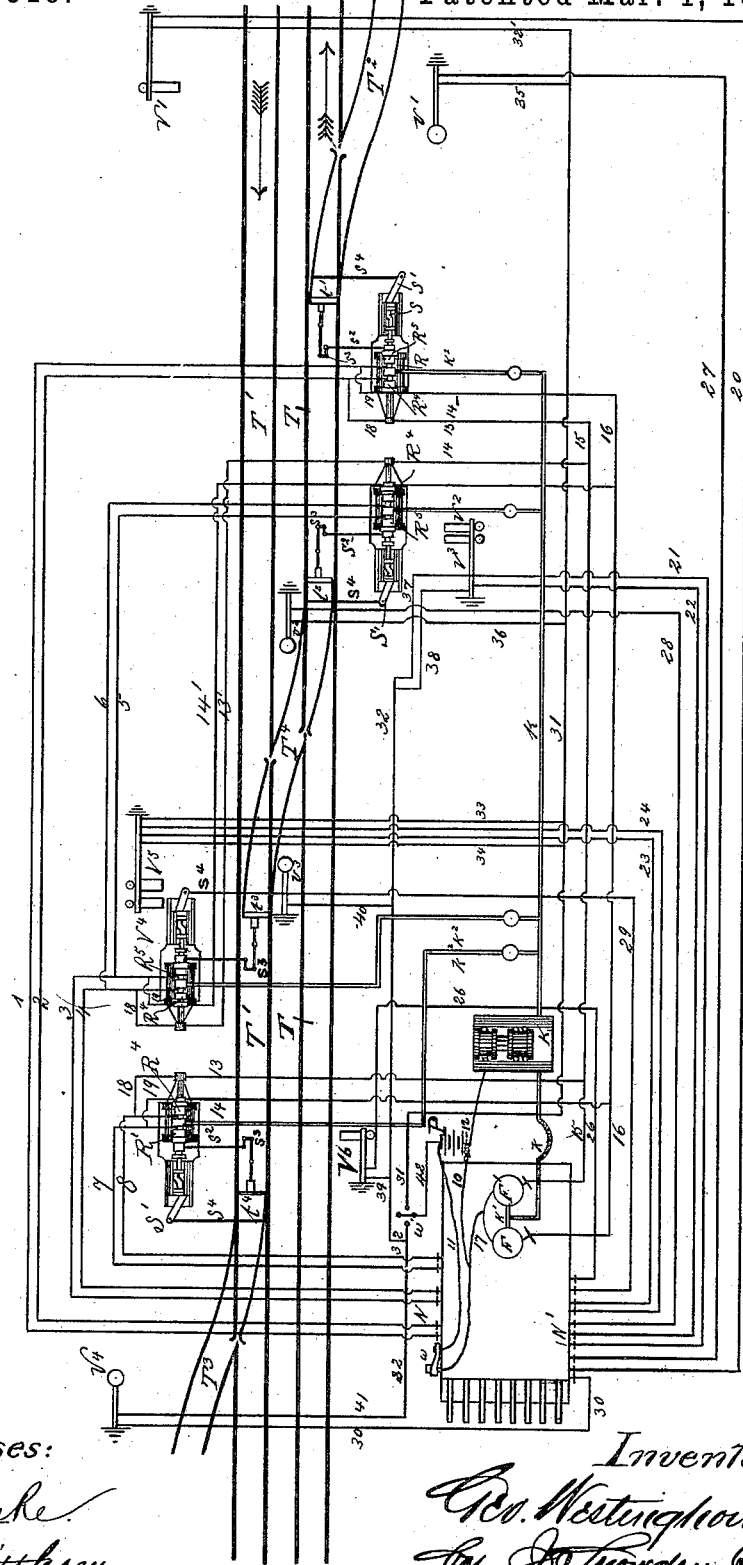

With switch-key $w'$ in the position shown in Fig. 16, all three signal-currents will still be opened at that point and all the signals will be at "danger," their normal position. If, however, the switch-key be moved onto the left-hand button, circuit will be completed for signals $V^6$ and $V^2$, or, if moved to the right-hand button, circuit will be completed for signal $v'$. Thus, by reversing key $w'$, signals may be cleared for passage of train in either direction; but conflicting signals cannot be given, because both return-wires 31 and 32 cannot be closed at the same time. This key $w'$ may also be used to break signal-circuits when it is desired to hold a train, instead of shifting the catch $d^2$ from the deep to the half seat of notches $d^3$, as above described.

The relative order or succession of making and breaking switch and signal circuits by movement of the sliding bars will depend upon conditions which may differ in different cases. In order, however, to illustrate the operation involved, I have shown by the diagrammatic views, Figs. 11 to 15, Sheet 7, the operation of one of the sliding bars—say bar B—in moving the switch $t'$, (see Diagram Fig. 16,) and in clearing the signals belonging thereto. From this illustration and from the foregoing description those skilled in these matters can adapt the apparatus to all the requirements not only of the particular track shown in Fig. 16, but also of the other arrangements of tracks, as conditions of use may require. In these views, Figs. 11 to 15, only such means are shown as relate directly to the points to be illustrated, other parts of the apparatus being omitted; also, for convenience, the relative positions of parts, including circuits, batteries, &c., are changed somewhat, though the same letters of reference are used for parts similar or corresponding to those shown in other figures of the drawings.

The train movements illustrated are, first, for passage of train on main track T; second, passing from track T to siding $T^2$; third, passing from siding $T^2$ to track T. These train movements are controlled by one sliding bar—say bar B.

In Fig. 11, the apparatus, circuits, signals, and switches are shown in normal position. The catch $d^2$ is in first sector-notch $d^3$. The bar B is pushed back. The pawls $e^2$, abutting against the inner raised stop, $e^7$, contact is broken between all the springs $o$ $o'$ and terminals $a$ $a'$. The switch and signal circuits are all open. All the signals $V^6$, V, $V^2$, and $v'$ are at "danger," and switch $t'$ is closed, giving through track T. Before a train can pass on this track the proper signals $V^6$ and $V^3$ must be set at "safety." To do this, lever D is drawn forward into the second sector-notch $d^3$, as in Fig. 12, thereby making contact simultaneously between springs $o'$ for both lines 22 and 26. Switch-key $w'$ is also turned onto its left-hand button to complete the signal-circuits. In moving lever D from the first to the second sector-notch the first notch, $e$, on the sliding bar B is drawn past the points of pawls $e^2$. If the notch were open, the pawls would fall into it and lock the bar, thereby preventing further movement, because in the present case no switch-circuits, and therefore no interlocking circuits, are made at this position of the sliding bar. In order, therefore, to prevent such locking in the first notch and to permit the bar to be drawn past it, it is filled flush with the shoulders $e'$ by the removable piece $e^9$, before described. Occasion for bridging a notch or locking point in this manner frequently arises in adapting the apparatus to special conditions of use, and the provision by which it may be accomplished is simple, convenient of application, and an important feature in the construction and adaptation of the apparatus.

Figure 12:
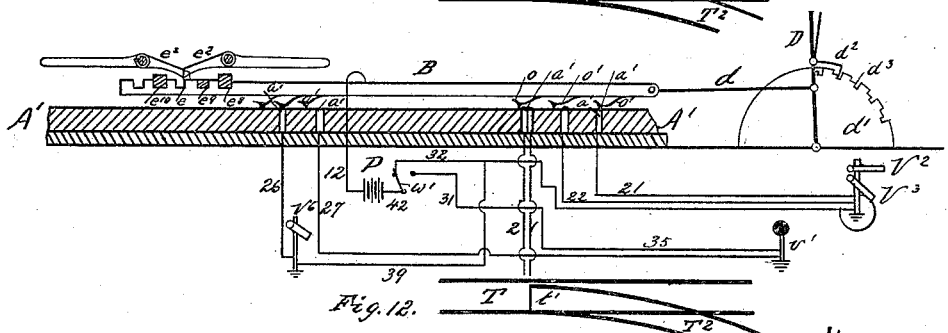
Figure 13:
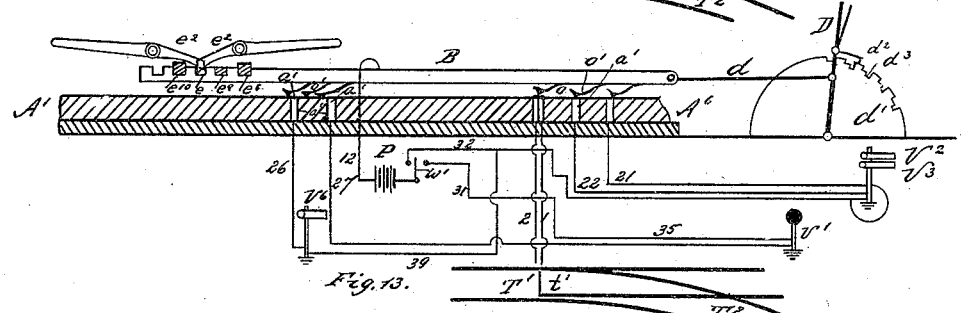
Figure 14:
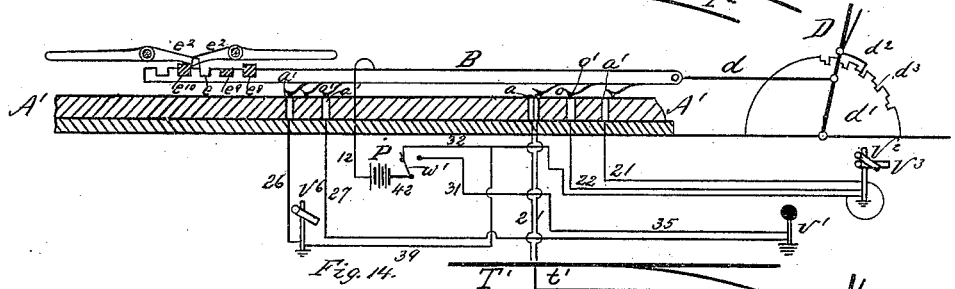
Figure 15:
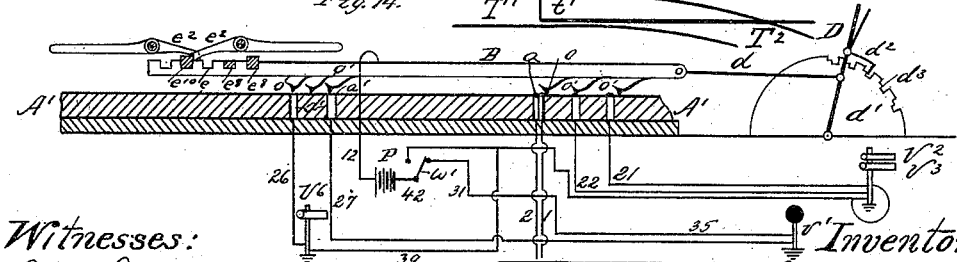

The circuits made by movement of the sliding bar to the position Fig. 12 are over lines 22 and 26 to signals $V^3$ and $V^6$, and thence by wires 38 and 39 to return 32, key $w'$, wire 42 to battery, the sliding bar being connected through the frame of the apparatus and wire 12 with the other pole of battery. The next forward movement of the sliding bar (represented in Fig. 13) is employed in opening the switch $t'$. In doing this the first effect is to break the circuits to signals $V^3$ $V^6$ by moving their springs $o'$ off the terminals $a'$, thereby displaying "danger" signals for main track as well as for siding, all the signals being in normal position. As the position of the sliding bar shown in Fig. 13 is approached or reached, the pawls $e^2$ drop into the open notch $e$, and the spring $o$ makes contact with the first adjacent terminal $a$ of the switch pair shown. This contact gives circuit from battery over wire 12, bar B, spring $o$, terminal $a$, line 2, helix R of the switch-engine, (see Sheets 4 and 8,) pipes $k$ $k$, reservoir K, wire 10 to key $w$, and if this be closed then to battery by wire 11. This circuit is in operation for moving the switch-engine from normal position; also, for this position of the switch-engine, (see Fig. 6,) the current over line 2 is divided, a part taking the wire 18, forming a circuit around helix $R^4$ through posts $u^4$ $u^4$, wires 13 and 15 to unlocking mechanism $F'$, thence by wire 17 to key $w$, and upon closing the key to battery this circuit provides for raising the end set of pawls $e^2$ for backward movement of the sliding bar, if from any cause it becomes desirable to restore the apparatus to normal position.

By slight further movement of the sliding bar within the range provided by the length of notches $e$, the spring $o$ makes contact with the second terminal $a$ of the pair—namely, that with which line 1 is connected. This is the position of parts shown in Fig. 13, and by it circuit is afforded from battery through wire 12, bar B, spring $o$, terminal $a$, line 1, helix $R^5$, pipes $k^2$ $k$, reservoir K, wire 10 to key $w$, and this being closed by wire 11 to battery, thereby causing the switch to be thrown, as before described. Upon completion of this switch movement an additional circuit is afforded from wire 1 by wires 19 14 16, unlocking mechanism F, wire 17 to key $w$, and to battery upon closing the key. By this latter circuit the pawls $e^2$ may be unlocked for further forward movement. This cannot be done, however, until the circuit has been closed at $u^3$ $u^3$ of the switch-engine, and this occurs only at the completion of the switch movement; hence the existence of a current in such circuit is evidence that the proper switch movement has been effected. After unlocking, by means of this circuit, the next forward movement of the sliding bar brings it to the positions shown in Figs. 14 and 15, the catch $d^2$ being in the third sector-notch $d^3$. The first result of this movement is to break the contact between spring $o$ and switch-terminals $a$, thereby leaving the pawls $e^2$, resting on the shoulder $e'$, subject to the action of springs $e^5$, and contact is made between three of the springs $o'$ and corresponding signal-terminals, $a'$, thereby making circuit-lines from battery P over the wires 21, 26, and 27 to signals $V^2$, $V^6$, and $v'$. Return-circuit from the signals is made by wires 37 and 39 for signals $V^2$ $V^6$, and common line 32 to the left-hand button of key $w'$, and by wire 35 to line 31, and to the right-hand button of the switch-key. If this key be turned to the left-hand button, the signals $V^2$ $V^6$ will be cleared for passage of train from track T to siding $T^2$. If, on the other hand, the key $w'$ be turned to the right-hand button, the signal $v'$ will be closed to pass from siding $T^2$ to track T. Thus signals may be cleared for passing in either direction over this combination of track without necessary movement of the sliding bar. If it is desired for any cause to stop or hold the train, the lever D may be moved backward a little, bringing the catch $d^2$ into the half-seat of the notch and breaking the signal-circuits between springs $o'$ and terminals $a'$, as before described. In the particular yard shown the movements described and illustrated, Sheet 7, complete the combinations of track and signals which it is preferred to make with sliding bar B. Consequently a raised stop, $e^{10}$, may be set in the third notch $e$, against which the pawls $e^2$ abut, (see Figs. 14, 15,) and thereby prevent further outward movement of the bar.

In returning the apparatus to normal position the order of movements is reversed—that is, circuits for signals $V^2$, $V^6$, and $v'$ are first broken, the signals going to "danger," then the pawls $e^2$ drop into the open notch $e$, and contact is made with terminal $a$ for line 1. This circuit is practically inoperative for the purpose in view. Contact with the terminal for line 2, however, affords circuit through mechanism F', to unlock the end set of pawls, $e^2$, as above described, whereupon the sliding bar may be set, as in Fig. 12, to clear the signals for through track; or it may be set as in Fig. 11, the normal position, in which all tracks are blocked, and the rocking bar C is restored to horizontal position, so that when it is again desired to make a train movement any one of the sliding bars may be drawn. I do not consider it necessary to describe in detail the operation of each one of these bars in making their respective combinations. It may be stated, generally, however, that sliding bar B' may be employed to operate switch $t^4$ and signals V', $V^4$, $V^5$, and $v^4$, which control train movements over track T' and siding $T^3$, and that the operation in doing this will be substantially a repetition of that given above for bar B. Another bar—say $B^2$—may be employed to operate the switches $t^2$ $t^3$ for crossing $T^4$ either above or in combination with one or both of the siding-switches $t'$ $t^4$, the appropriate signals accompanying these switch movements. Another remaining bar, $B^2$, may operate the crossing, together with one siding-switch and the appropriate signals, the order of switch movements being reversed from that of bar $B^2$.

Thus far a description has been made on the assumption that the apparatus is adapted to the first condition of yard above stated—namely, in which but one train movement can be effected at one time, and, as described, the combination of track for such train movement is made by movement by one sliding bar, and the track combination is followed by operating the signals appropriate thereto.

It will be noted that the combinations assigned above to the sliding bars $B^2$ and $B^3$ are composed of the crossing $I^4$, with one or both of the sidings $T^2$ $T^3$. In many cases it may be desired to use the crossing $T^4$ from track to track without going to either siding. In order to accomplish this with the four-lever machine appropriated as above described, I adapt it in part—say for bars $B^2$ $B^3$—to the second condition of yard at first assumed—namely, in which the whole or a part of a given combination may be made—thereby providing for different train movements without return to normal position. In doing this the signals appropriate to a part of the whole combination of track follow immediately the completion of such part, so that signals may be cleared for passage of train over the part combination, or by further movement of the sliding bar the entire combination may be made and signals cleared for passage of train over the whole combination. For illustration I will describe briefly the operation of bar $B^2$, assuming its order of switch movement to be first crossing, $T^4$, by switches $t^2$ $t^3$, second siding, $T^3$, by switch $t^4$, and third siding, $T^2$, by switch $t'$. Preparatory to orderly description, it may be stated that for all requirements of use the switches $t^2$ $t^3$ for crossing may be moved simultaneously. Consequently I have shown (see Fig. 16) the lines 5 and 6 for $t^2$ branching from the lines 3 4, respectively, of switch $t^3$; also, in order to insure complete throw of both switches before unlocking circuits are made, wires 13' 14' of engine for one switch—say $t^3$—are carried to the posts $u^4 u^5$ of the engine for the other switch, $t^2$, of the crossing, and the wires 18 19 are omitted on this latter engine, and from its opposite posts, $u^4 u^5$, the usual wires, 13 14, connect with the wires 15 16, as before described. The unlocking-circuits thus provided are practically common to both engines, and will be broken by incomplete piston movement in either. Consequently if current is secured through the unlocking mechanism, after operating these engines, its existence will be evidence that the desired operation is complete. For the purpose of making a part or the whole of the combination given for $B^2$ in the order stated above, the bar is drawn out, and in so doing the other sliding bars are locked by its rocking bar $C^2$. When the hand-lever catch is about midway between the first and second sector-notches $d^3$, the pawls $e^2$ drop into the first notch $e$ of bar $B^2$, that notch being open in the present case. While the sliding bar is thus locked by pawls $e^2$, contact is made by a spring, $o$, with the first of a pair of switch-terminals—namely, that for line 4 and for line 6, branching from 4. This circuit is for the purpose in view practically inoperative. Contact, however, with the second terminal $a$ of the pair gives circuit from battery P through the sliding bar, spring, and terminal to lines 3 and 5, helices $R^5$, and pipes $K^2 K$ to battery, as before described. In response to current over this circuit both switches are "opened"—that is, set for crossing—and also on complete throw of both switch-engines circuit is made from line 3 by wires 19 14' 14 16, unlocking mechanism F, wire 17, to key $w$, and, this being closed, to battery by wire 11. This circuit unlocks the sliding bar by raising the inner set of pawls, $e^2$, whereupon the bar may be drawn to its next position, in which the catch $d^2$ rests in the second sector-notch $d^3$. The pawls $e^2$ rest on the first shoulder $e'$, following the first notch $e$, and contact is made by spring $o'$ with the signal-terminals $a'$ for lines 28 and 29. These lines lead to the switch-signals $v^2 v^3$, respectively. From signal $v^2$ a wire, 36, makes connection with return-wire 31, and from signal $v^3$ a wire, 40, makes connection with the other return-wire, 32. If the key $w'$ be turned to its right-hand button, circuit will be completed for signal $v^2$, and that signal be cleared for passing from track T to T'. If the key $w'$ be turned to its left-hand button, the signal $v^3$ will be cleared for passing from track T' to T. If this completes the desired train movement, the sliding bar may be returned to normal; or if, on the other hand, the purpose is to pass from track T to siding $T^3$ or reverse, the switches $t^2 t^3$ are opened, as above described, and the sliding bar is drawn beyond the second sector-notch $d^3$ without necessarily stopping to operate the signals $v^2 v^3$. This further movement permits the pawls $e^2$ to drop into the second notch $e$ when contact is made by a spring, $o$, with a terminal, $a$, for line 8, which is practically inoperative. Then by slight further movement of the bar contact is made with the second terminal $a$ of the pair, giving a circuit over line 7, which first opens switch $t^4$, and then affords unlocking circuits through F, substantially as before described. By unlocking and moving the sliding bar so that catch $d^2$ rests in the third sector-notch $d^3$ contact is made by springs $o'$ with four terminals, $a'$—namely, for lines 23, 28, 29, and 30—for signals $V^4$; $v^2$, $v^3$, and $v^4$, respectively. Signals $v^2 V^4$ have return-connection by wires 36 and 34 with line 31 to right-hand button of key $w'$, and the signals $v^3 v^4$ make return by wires 40, 41, and 32 to the left-hand button of the key. By moving the key to the right or left signals may be cleared for passing in either direction over the track between T and $T^3$. If siding $T^2$ is to be added, thus completing the full combination, the sliding bar is moved directly from the second to the third locking notch $e$ without necessarily stopping to display the signals last above described. While locking in this third notch, the sliding bar makes circuit by its springs $o$ and the appropriate pair of terminals $a$ $a$ first with line 2, and, second, with line 1, by which switch $t'$ is opened and unlocking circuit through F is secured, as before described. By further outward movement of the sliding bar after unlocking contact is made by springs $o'$ with six terminals $a'$ for lines 21, 23, 27, 28, 29, and 30 for signals $V^2 V^4 v' v^2 v^3 v^4$, respectively. Return is made from the signals $V^4 v' v^2$ to the right-hand button of key $w'$ by the connections before described, and from signals $V^2 v^3 v^4$ to the left-hand button, so that signals may be cleared by turning the key for passing in either direction between sidings $T^2$ and $T^3$.

The construction above described and illustrated for displaying the appropriate signals for a condition of track, which condition may itself be only a part of some greater combination, is an important feature of improvement and advantage.

As above described, the entire combination of track and signals is manipulated by movement of one sliding bar. This is not a necessary condition, however, as the conditions of a yard may be such as to permit of movement of two or more sliding bars simultaneously, either for independent train movements or for making up a combination of tracks and signals for one train movement. This latter form of application is more appropriate, however, to the third condition of yard assumed above—namely, yards of sufficient size to admit of making two or more train movements at one time without interference. The plan of yard shown in diagram Fig. 16 may be used to illustrate this condition in a measure. For example, trains may be run simultaneously from tracks T and T' to sidings T² T³ without interference.

As above described, train movements between track T and siding T² are controlled by sliding bar B, and train movements between track T' and siding T³ by sliding bar B'. In describing Fig. 1 with reference to the first-assumed condition of yards, it was stated that locking-stops $b$ were secured on the sliding bars back of the locking-edge $c^5$ of all the rocking bars, such arrangement of stops being illustrated by Fig. 1, whereby the act of drawing one sliding bar locks all the rest by tipping its rocking bar into engagement with the stops.

In Fig. 7, Sheet 5, I have shown the rocking bars C C' C² C³ and a portion of each sliding bar B B' B² B³, with such modification in the arrangement of the stops $b$ as to permit of drawing bars B and B' together, or one after another, without necessarily returning the one first drawn to normal position, so that the bar B and B', with this modification, may be used in the yard shown, Fig. 16, as stated above with reference to the third class of yards. This modification consists in omitting some of the stops—$b$, for example: The stop is omitted from bar B' immediately in rear of rocking bar C, so that tipping this rocking bar by drawing out B will not lock B'; also, in like manner the stop is omitted from bar B, immediately in rear of rocking bar C', so that bar B will not be locked by drawing out bar B'. The operation involved in drawing out these bars for making their respective combinations and signals in this connection is the same as above described, and need not be repeated.

The bars B² B³, as above described, control combinations which affect both main tracks T T'. Consequently, if both of them could be operated at once, interference or conflict in train movements might arise. Consequently I have shown them both with stops $b$ in position to lock with the rocking bars C C'.

While the yard or track, Fig. 16, will admit of but few train movements at once without interference, yet the instances described will suffice to illustrate the principles of construction and adaptation involved, and persons sufficiently skilled in such matters can from this description and illustration determine in each individual case what stops $b$ may be omitted from the respective sliding bars without introducing danger of interference in train movements.

It will be observed, also, that in the application of the apparatus shown the switches $t^2$ and $t^3$ and the signals $v^2$ and $v^3$ are operated by the two sliding bars B² B³ only. Consequently the wires $m$ and $m'$, (see Fig. 10,) which form parts of the circuits for these switches and signals, may be limited in length so as to pass under these two bars only, and the remaining parts of these wires $m$ and $m'$—namely, those parts under the bars B B', being connected to their appropriate posts, N or N', by the connecting-wires $m^3$ or $m^2$—may be appropriated to other circuits which are to be made and broken by the bars B B' only. The circuits to some of the switches and signals—for example, switches $t'$ and $t^4$, with their signals—are made and broken by three of the sliding bars, and cases may arise in which some one or more circuits may be broken by all of the sliding bars. In such cases the wires $m$ or $m'$, as the case may be, may be extended under all the sliding bars—for example, like the second pair of wires, $m'$, from the right, and the first pair on the left, Fig. 10; or if these wires be divided, like the wires $m'$, then two binding-posts, N or N', may be connected, which will in effect secure the same continuation under all the sliding bars.

Near the center of Fig. 10 I have shown one pair of wires, $m'$, divided, so that the lower parts on the sheet connect with the terminals $a'$ under three of the sliding bars. These may be appropriated to signals like $v'$ or $v^4$, the circuits of which are made and broken by three sliding bars. The remaining portion of these wires $m'$, at the upper side of the figure, make connection with the only one pair of terminals $a'$, and they may be appropriated to a signal controlled by one sliding bar alone; or their posts N' may be connected electrically to some others, so as to give their circuits practically greater extent under other sliding bars. These instances of specific application are referred to to illustrate the purpose and principles involved in the subdivisions of cross-wires $m$ $m'$, the construction of which was described in a former part of this specification. By means of such subdivision the capacity of the apparatus in making and breaking circuits can be utilized to its fullest extent, and a comparatively small machine be made to do the work which would require a much larger machine in case all the wires $m$ $m'$ extended under all the sliding bars, or, in other words, were not divided.

The wires $m$ $m'$ $m^2$ $m^3$ are designed primarily as a medium of connection between the terminals $a$ $a'$ and the binding-posts, and they afford cheap and convenient means of making such connections; but suitable electrical connections between the lines to switches and signals may be made in other ways without departing from my invention. For example, some or all of the pins or terminals may extend downward through the bed and be connected directly with any suitable binding mechanism for making electrical connections with the several lines and with any desired number of other terminals, the connections between terminals being in this case the equivalents of the wires $m$ $m'$.

In practice any desired number of signals or of switches may be operated for one position or movement of the sliding bar, limited only by the battery-power employed and the conditions of track. One method of operating two separate switches at one time is illustrated in the circuits for switches $t^2$ $t^3$, above described, the lines 5 and 6 being shown as branches of lines 3 and 4. If desired, however, the lines 5 and 6 might be carried independently to posts N N', and these posts be connected electrically with the posts for lines 3 and 4, whereby one contact between spring $o$ and terminal $a$ would give current over two lines—say 3 and 5 or 4 and 6. In like manner any desired number of posts, either for switches or signals, may be connected so as to obtain a corresponding number of circuits for one contact, $o$ $a$ or $o'$ $a'$, thereby making provision for effecting given combinations of switch and signal movements with comparatively little manipulation of the levers.

For similar reasons of economy and convenience, I have shown the unlocking-circuits branching by wires 18 19 from the switch-lines 1 2 3 &c., so that the two circuits are operated by a dividing current. If desired, the wires 18 19 may be extended to separate binding-posts on the machine independent of the switch-lines 1 2 3 &c., and circuit may be made with such extended wires by providing springs and terminals in proper relation to the springs $o$ and terminals $a$ to make contact in unison therewith, so as to complete the unlocking circuit upon completion of switch movement. The principal object in this connection is to make the unlocking-circuits dependent upon the switch movement. In accomplishing this various modifications, in addition to those described, may be made both in the make-and-break mechanism connected with the operation of the sliding bars and also in the switch-shifting mechanism. For example, instead of the stem $u$ making and breaking contact with the springs $u^2$ $u^3$, any other suitable or well-known form of make-and-break mechanism may be employed, and such make-and-break mechanism may be actuated by any of the movable parts of the switch or the operative mechanism connected therewith; also, instead of making such unlocking-circuits dependent upon a switch and its operating mechanism, they may be applied in substantially the same manner to signal-operating mechanism, bridge-turning mechanism, bridge-locks, and other applications of kindred nature connected with railway-tracks where signals are made to follow some predetermined conditions of track under control of an interlocking system. Neither do I wish to limit my invention by the specific construction of mechanisms employed for shifting switches or signals or for unlocking the pawls, as any suitable or well-known electrically-controlled power mechanisms may be employed for these purposes, which in the combinations of such devices, hereinafter claimed, I include as the mechanical equivalents of the mechanisms shown and described; also, in the use of the switch-shifting engines for making and breaking the unlocking-circuits other means than electric circuits may be employed for controlling the valve movements—as direct mechanical connection, or hydraulic or pneumatic power, for example—and in so far as such methods of operating the valves are equivalents of the circuits described in the combination of the engine with the unlocking-circuit and mechanism controlled thereby they are included herein. Other applications will be made, however, for patents for mechanism involving these and similar features of construction and combination in so far as the same may involve patentable subject matter.

It has been described that by turning the key of switch $w'$ to the right or left button either set of signals may be cleared, as desired; but conflicting signals cannot be given by clearing both sets at once. The same results may be secured, in part at least, by movement of the sliding bars. For example, springs $o'$ may be provided to make circuits for one set of signals when the bar is drawn to drop the catch $d^2$ in the half-notch $d^3$, and with the other set when the spring is in the deep notch; or, on the other hand, one sliding bar, as B, may be employed to effect a certain combination of switch movements with a set of signals for train movement in one direction, and another bar B be employed to move the same switches, followed by setting another set of signals for train movement in different direction. Such construction, however, involves much larger and more expansive machines, and for that reason I prefer to employ the switch $w'$, with return-circuits connected thereto, as shown, to accomplish the desired results.

By means of the pawls $e^2$ and the mechanism described for operating the same the sliding bars are locked in positions for making switch-circuits, and the lock thus effected is practically independent of the interlocking effected by the rocking bars C C', &c. This feature of independent lock and the provision made, as hereinbefore described, for making and breaking the circuits which control the same, both by the interlocking mechanism and by the switch-shifting mechanism, I consider important features of my invention, and in referring herein to an independent lock I mean a lock for the sliding bars, or equivalent make-and-break mechanism, in addition to and as distinguished from the interlocking effected between two or more such bars.

It will be noted that both the return-lines for switch-circuits—namely, by pipe $k^2$ $k$, or equivalent ground, and those for the unlocking-circuits by separate lines 15 16—are passed through key $w'$. It has been assumed in the foregoing description of switch-circuits that connection through this key was closed. In practice the key is normally open and must be depressed by the operator in order to make the closed switch circuits described, both in moving the switch-points and actuating the unlocking mechanism F F'. The purpose of this feature of construction is to open the switch-lines to both poles of battery, except when operations are being performed. The use of such a key, $w$, in making and breaking circuits may, if desired, be dispensed with without departing from my invention. If closed connection be substituted for the key, which may be done, the entire operation of controlling switch movements will be effected by movements of the sliding bars through the hand-levers D, and such switch movements will not only be made in a predetermined orderly succession, but also signals for a train movement cannot be given until the switch movement is complete and the sliding bar unlocked as a result of such completion. Substantially all the advantages in point of safety are thus secured in an electro-pneumatic system ordinarily required in interlocking apparatus.

In describing the contacts made with the two terminals of a switch pair, $a$ $a$, I have, for the sake of full description, followed the circuits made and the results effected by both, and have also stated that the circuit first made by such contact is practically inoperative except for unlocking. If the key $w$ is used, the first circuit of a pair will be actually inoperative unless the key is closed, and if the key is not used this first contact in a pair will ordinarily be momentary, since the operator will immediately draw the bar to the second contact, which affords the circuit which is operative on the switch to be moved, so that in moving the sliding bar in a given direction the first switch-circuit made in each pair may be, for the immediate purpose in view, inoperative, as stated, though it is of importance and material advantage in reversing movements and in affording unlocking-circuits for movement of the sliding bar in either direction from its lock positions. Another element of utility and advantage secured by this arrangement of switch-terminals and locks is the guide afforded by the locks in setting the sliding bar to make contacts with the terminals—that is, the terminals $a$ $a$ and springs $o$ are so set that contact is made when the ends of pawls $e^2$ abut against the side walls of notches $e$. Consequently, in order to make contact with either terminal $a$ in the locked position, the operator draws the sliding bar outward or backward, as the case may be, until stopped by the pawls. For example, in drawing out the bar B, as above described, (see Sheet 7,) he first draws the hand-lever D until its catch $d^2$ drops into the seat of notch $d^3$, this notch being a guide to the operator in making the signal-contacts, Fig. 10. He then raises the catch and draws the sliding bar until stopped by the inner set of pawls, as in Figs. 9 and 13, in which position the second contact is secured in the pair of terminals $a$ $a$, having passed over the first terminal $a$ without stopping. In like manner the operator moves from sector-notch to pawl-stop by successive steps, each position affording the desired terminal-contacts. The same is true in restoring the sliding bar to normal.

It has been stated that the unlocking-circuits formed after switch movements through lines 15 16 are obtained only upon complete throw of the piston-stems $u$. This is true to such extent that a thin stone, piece of ice, or other obstruction—say one-fourth inch in thickness—interposed between the rail and switch-point will prevent completion of the unlocking-circuit. Consequently, failure to unlock after switch movement indicates "danger" in the switch that should be removed before permitting a train to pass, and if the apparatus be operated as intended this safeguard must be observed, because the sliding bar cannot be moved to make signal-circuit until unlocked by the return switch-current.

In adapting my improved apparatus to special requirements of individual cases, any desired number of sliding bars—say one or more—may be used with a corresponding number of rocking bars and intermediate locking-notches or equivalent projections on the sliding bars; also, if desired, the locking-pawls $e^2$ may receive both locking and unlocking movement from the piston-stems $H^4$. Instead of employing large and complicated machines, two or more small ones may be coupled together, as illustrated in Fig. 1, especially where the yard is of such a nature that it is practically divided into two or more parts. To this end connection is made at O, Fig. 1, between the pivots $c$ of the rocking bars in line in the coupled machines, whereby the act of drawing any one of the sliding bars will cause its rocking bar and the one in line therewith in the companion machines to interlock with all the remaining sliding bars, or with all such as may be provided with stops $b$ in proper position.

In order that the act of drawing a sliding bar—say, bar B, or any other one in any of these coupled machines—may cause the corresponding sliding bar in the companion machine to be locked by its locking-bar, a stop, $b$, may be placed on each and all the sliding bars (see Fig. 1) immediately in rear of its rocking bar, and in order to prevent such stops from interfering with the operation of the rocking bars in tipping the latter are cut out, as at $c^6$, Figs. 2 and 7, on the under side sufficiently to clear the stops; also, with the same purpose in view, the notches $c^3$ are extended a little, so as to give the stops back of them a little movement under the rocking bar before the latter begins to tip. In single uncoupled machines these features of special provision will not be required—that is, the stops $b$, immediately in the rear of the lifting-arm $c^2$, on each bar may be omitted, as illustrated in Fig. 7, Sheet 5; also, the notches $c^3$ may be formed with reference to imparting the interlocking movement of the rocking bars immediately the sliding bars begin to move. Instead of raised stops $b$ locking with the depressed edges of the rocking bars, corresponding holes may be made in the sliding bars with rearward arms on the rocking bars adapted to enter such holes, when tipped, and thereby effect the desired lock; also, instead of counter-weights $c'$, or their equivalent spring, $c^7$, a raised surface may be made on the sliding bar in rear of the rocking bar, on which a rearward arm from the rocking bar may ride, and thus restore the rocking bars to horizontal position when the sliding bars are returned to normal position, as illustrated in Fig. 7ª; also, other like modifications may be made in details of construction, all of which, constituting equivalent features of construction, I include herein as coming within my invention.

The construction and combination of mechanical elements involved in the interlocking mechanism above described, so far as the same are independent of combination with electric circuits and electrically-controlled mechanism governed by the making and breaking of said circuits, are not claimed herein as part of my present invention, but are reserved for and will be embodied in a separate application for Letters Patent.

I am aware that longitudinally-moving bars carrying circuit-closing devices, by which, on the movement of the bars, to make or break a circuit through fixed terminals, broadly considered, are not new; but I am not aware of any prior use of such apparatus in combination with a mechanism, also operated by such bar movement, whereby one bar, when in position for closing a circuit, shall also automatically lock some other parallel and similarly-operating bar, and thereby prevent the closing of a circuit, which, if closed, would then be detrimental or objectionable.

I claim herein as my invention—

1. The combination of sliding bars B B', in any desired number, having notches e thereon, two sets of pivoted pawls, $e^2$ $e^2$, engaging such notches from opposite directions, and electrically-controlled fluid-pressure mechanism for disengaging each set of pawls from the notches, substantially as set forth.

2. The combination of sliding bars B B', in any desired number, having notches e thereon, two sets of pivoted pawls, $e^2$ $e^2$, interlocking with the notches from opposite directions, springs $e^5$, and electrically-controlled fluid-pressure mechanisms F F', for unlocking the pawls, substantially as set forth.

3. The combination of insulating-bed A', terminals a a', in any desired number, with provision for making electric-circuit connection therewith, sliding bars B B', in any desired number, having movable contacts thereon for making and breaking circuit with the terminals, and locking mechanism arranged in connection with one or more of said sliding bars and operated thereby with reference to the locking of one or more other bars, substantially as and for the purposes set forth.

4. The combination of insulating-bed A', wires m m', set in and crossing such bed, terminals a a', connected electrically with the wires, sliding bars B B', in any desired number, having contacts thereon for making and breaking circuits with the terminals, and locking mechanism arranged in connection with one or more of said sliding bars and operated thereby with reference to the locking of one or more other bars, substantially as set forth.

5. The combination of insulating-bed A', metallic wires m m', binding-posts N N', connected electrically with the wires, terminals a a', extending from the wires, sliding bars B B', in any desired number, located above and in line with the projecting terminals, contacts secured to and movable with the sliding bars for making and breaking circuits with different terminals in succession, and locking mechanism arranged in conection with one or more of said sliding bars and operated thereby with reference to the locking of one or more other bars, substantially as set forth.

6. The combination of sliding bars B B', in any desired number, having contacts thereon for making and breaking circuits by movement of the bars, terminals a a', beneath the bars and in line with their contacts, wires m m', connected electrically with the terminals, some or all such wires having terminal connections beneath a part only of the sliding bars, and binding-posts N N', connected electrically with the wires m m', substantially as set forth.

7. The combination of bed A', terminals a a', located in separate rows on the face of the bed, longitudinally-sliding bars above and in line with the rows of terminals, and springs secured to and movable with the sliding bars, such springs having bearing upon the bed in line with and adapted to make contact with one or more rows of terminals, substantially as set forth.

8. The combination of longitudinally-sliding bars B B', &c., in any desired number, having two or more contact-springs, o o', secured thereto, terminals a a', beneath the bars in the path of their springs, and locking mechanism arranged in connection with one or more of said sliding bars and operated thereby with reference to the locking of one or more other bars, substantially as set forth.

9. The combination of a fluid-pressure engine for actuating a movable part or appliance on or connected with a railway-track, a hand mechanism for controlling the movements of such engine, an independent electrically-actuated lock for locking the hand mechanism, and an electric circuit or circuits controlling the lock, such circuit or circuits being made and broken by the movement of the engine at the end of its stroke, substantially as set forth.

10. The combination of an electrically-controlled fluid-pressure engine for actuating a movable part or appliance on or connected with a railway-track and electric circuit or circuits for operating such engine, mechanism for making and breaking such circuits in succession, an independent electrically-actuated mechanism for locking the make-and-break mechanism, and an electric circuit or circuits controlling the mechanism, such circuits being made and broken by the movement of the engine at the ends of its stroke, substantially as set forth.

11. The combination of a fluid-pressure engine for actuating a movable part or appliance on or connected with a railway-track, a hand mechanism for controlling the movement of such engine, an independent electrically-actuated mechanism for locking the hand mechanism, and an electric circuit or circuits for controlling the lock, such circuit or circuits being made and broken both by the hand mechanism and by the movement of the engine at the ends of its stroke, substantially as set forth.

12. The combination of hand-controlled mechanism for operating a switch or other movable part or appliance on or connected with a railway-track, electrically-controlled fluid-pressure mechanism for locking the hand mechanism at intermediate positions, and an electric circuit or circuits for controlling the fluid-pressure mechanism, such circuits being made and broken at the completion of movement of the switch or equivalent track mechanism, substantially as set forth.

13. The combination of a series of two or more electrically-controlled fluid-pressure engines for actuating switches or other movable part or appliance on or connected with a railway-track, an interlocking make-and-break mechanism, and electric circuits opened and closed by such make-and-break mechanism for operating the engines in predetermined order, substantially as set forth.

14. The combination of a series of two or more electrically-controlled fluid-pressure engines for operating switches, a series of two or more electrically-actuated mechanisms for operating signals, an interlocking make-and-break mechanism, and electric circuits opened and closed by the make-and-break mechanism for operating the switches and signals in predetermined order, substantially as set forth.

15. The combination of a series of two or more fluid-pressure engines for operating switches, a series of two or more power mechanisms for operating signals, an interlocking mechanism for actuating the switch-engines and signal mechanisms in predetermined succession, an independent electrically-controlled fluid-pressure mechanism for locking the interlocking apparatus in positions for operating the switches, and an electric circuit or circuits for controlling the fluid-pressure lock, such circuits being made and broken by movement of the switch-operating mechanism, substantially as set forth.

16. The combination of a series of two or more electrically-controlled fluid-pressure engines for shifting switches, two or more electrically-controlled mechanisms for operating signals, electric circuits for actuating the switch-engines and signal mechanism, interlocking mechanism for making and breaking such circuits in predetermined order, electrically-controlled fluid-pressure mechanism for locking the interlocking mechanism in positions for operating the switch-engines, and two electric circuits for controlling the fluid-pressure lock, such circuits being made and broken at opposite limits of the movement of the switch mechanism, substantially as set forth.

17. The combination of a series of two or more electrically-controlled fluid-pressure engines for operating switches, electric circuits for controlling the movements of such engines, interlocking mechanism for making and breaking the circuits in predetermined order, an independent electrically-controlled mechanism for locking the make-and-break mechanism in positions for making the circuits, and electric circuits controlling the independent locking mechanism, such circuits being made and broken by the interlocking make-and-break and by the movements of the switch-operating mechanism, substantially as set forth.

18. The combination of a series of two or more electrically-controlled fluid-pressure engines for operating switches, a series of two or more electrically-actuated signals, electric circuits for controlling the movements of the switch-engines and signals, interlocking mechanism for making and breaking such circuits in predetermined order, an independent electrically-controlled mechanism for locking the make-and-break mechanisms in position for making and breaking the switch-controlling circuits, and electric circuits controlling the independent lock, such circuits being made and broken both by the interlocking mechanism in its positions for making and breaking switch-controlling circuits, and also by each of the switch-operating mechanisms, substantially as set forth.

19. The combination of longitudinally-sliding bars, pawls locking with the bars at intervals in their range of movement, electrically-controlled power mechanism for unlocking such bars, electrically-controlled power mechanism for shifting a switch, electric circuits opened and closed in succession by movement of the sliding bars for actuating the switch-shifting mechanism, and electric circuits controlling the operation of the unlocking mechanism, such unlocking-circuits being made and broken by movement of the switch-shifter, substantially as set forth.

20. The combination of interlocking sliding bars, pawls locking with the separate bars at intervals of their movement, electrically-controlled fluid-pressure mechanism for unlocking the pawls, electrically-controlled fluid-pressure mechanism for shifting switches, electric circuits opened and closed by movement of the sliding bars, such circuits passing through the actuating-helices of the switch-shifters, and electric circuits made and broken by movement of the switch-shifters and sliding bars for actuating the unlocking mechanism, substantially as set forth.

21. The combination of interlocking sliding bars B B', in any desired number, locking-pawls $e^2$ $e^2$, electrically-controlled unlocking mechanisms F F', switch-shifters R, electric circuits passing through the helices of the switch-shifters and unlocking mechanism, such circuits being opened and closed by movement of the sliding bars, and a make-and-break mechanism in the common return of such circuits, independent in its operation of the sliding bars, substantially as and for the purposes set forth.

22. The combination of interlocking sliding bars, pawls locking with the bars, electrically-controlled power mechanism for unlocking the pawls, electrically-controlled power mechanism for shifting switches, electrically-controlled power mechanism for shifting signals, electric circuits passing through and actuating the helices of the switch-shifting and pawl-unlocking mechanism, and electric circuits passing through and actuating the helices of the signal-shifters, all such circuits being opened and closed in predetermined order by movement of the sliding bars, substantially as set forth.

23. The combination of longitudinally-sliding bars, pawls locking with the bars at intervals of their sliding movement, the bars having a limited range of movement in their locked positions, electrically-controlled power mechanism for unlocking the pawls, an electrically-controlled fluid-pressure engine for shifting a switch, and two electric circuits for effecting movement of the shifting-engine in opposite directions, both such circuits having terminals making contact with a sliding bar within the range of its movement when locked by the pawls, substantially as set forth.

24. The combination of longitudinally-sliding bars, pawls locking with the bars at intervals of their sliding movement, electrically-controlled power mechanism for unlocking the pawls, an electrically-controlled fluid-pressure engine for shifting a switch, and two electric circuits for effecting movement of the shifter in opposite directions, such circuits being made and broken in succession by movement of a sliding bar, the second to be made and broken being the operative one in actuating the engine, substantially as set forth.

25. The combination of longitudinally-sliding bars, pawls interlocking with the bars at intervals of their sliding movement, electrically-controlled mechanism for unlocking the pawls, electrically-controlled power mechanism for shifting a switch, two separate electric circuits for effecting movement of the switch mechanism in opposite directions, such circuits being made and broken in succession by movement of the sliding bar, the second one in order of making and breaking being the effective one for shifting the switch mechanism, and electric circuits passing through and actuating the helices of the unlocking mechanism, such circuits being made and broken by movement of the sliding bars and also by movement of the switch-shifters, substantially as set forth.

26. The combination of longitudinally-sliding bars, pawls locking therewith at intervals of their sliding movement, the bars having a limited range of movement in their locked positions, electrically-controlled mechanism for unlocking the pawls, electrically-controlled power mechanism for shifting a switch, two electric circuits for effecting movement of the switch mechanism in opposite directions, and two electric circuits actuating the unlocking mechanism, such unlocking-circuits being made and broken by movement of the switch-shifting mechanism, and all the circuits being made and broken by movement of the sliding bars in their locked positions, substantially as set forth.

27. The combination of longitudinally-sliding bars, pawls locking with the bars at intervals of their sliding movement, with limited range of movement in the locked positions, electrically-controlled mechanism for unlocking the pawls, electrically-controlled mechanism for shifting a switch, electrically-controlled mechanism for actuating a signal, two electric circuits for operating the switch mechanism, two electric circuits for operating the unlocking mechanism, the two latter circuits being made and broken by movement of the switch-shifting mechanism and all being made and broken by movement of the sliding bars in one of their locked positions, and an electric circuit for operating the signal mechanism made and broken by movement of the sliding bars between their locked positions, substantially as set forth.

28. The combination of two sets of electrically-actuated signals, electric circuits for actuating the signal of each set, the circuits in each set having a common return, make-and-break mechanism for connecting all the circuit-lines with one pole of battery, and a hand-switch for connecting either but not both return-lines to the other pole of the battery, substantially as and for the purposes set forth.

29. The combination of longitudinally-sliding bars, pawls locking with the bars at intervals of their movement, electrically-controlled mechanism for unlocking the pawls, electrically-controlled mechanism for shifting-switches, electrically-controlled mechanism for operating signals, electric circuits for the switch-shifting, and pawl-unlocking mechanisms made and broken by movement of the sliding bars in their locked position, electric circuits for the signal mechanism, made and broken by movement of the sliding bars between their locked positions, and a hand-switch in the return-lines of such signal-circuits for closing a part but not all of the signal circuits at one time, substantially as and for the purposes set forth.

30. The combination of longitudinally-sliding bars, pawls locking with such bars at intervals of their sliding movement, the bars having a short range of movement both in their locked and unlocked positions, electrically-controlled mechanism for unlocking the pawls, electrically-controlled engines for shifting switches, electrically-controlled mechanism for actuating signals, two electric circuits for operating the switch-shifters, two electric circuits for operating the unlocking mechanism, the two latter circuits being made and broken by movement of the switch-shifters, and all such circuits being made and broken by movement of the sliding bars in their locked positions, and electric circuits for operating the signal mechanism, such circuits being made and broken by movement of the sliding bars in their unlocked positions, substantially as set forth.

In testimony whereof I have hereunto set my hand.

GEO. WESTINGHOUSE, JR.

Witnesses:
R. H. WHITTLESEY,
C. M. CLARKE.